HOMOPOLYMERIZATION OF TRIOXANE WITH $BF_3 \cdot Bu_2O$
EFFECT OF $CH_2Cl_2$

COPOLYMERIZATION OF TRIOXANE AND ETHYLENE OXIDE
WITH $BF_3 \cdot Bu_2O$ AS CATALYST
EFFECT OF $CCl_4$, $CHCl_3$, $CH_3CHCl_2$ AND $ClCH_2CH_2Cl$
AS COMPARED TO $CH_2Cl_2$ Inventor
Catherine S.H. Chen
By Thomas J. Morgan
Attorney INVENTOR
Catherine S. H. Chen
BY Thomas J. Morgan
ATTORNEY

United States Patent Office 3,597,397
Patented Aug. 3, 1971

3,597,397
PROCESS FOR THE PREPARATION OF
OXYMETHYLENE COPOLYMERS
Catherine S. H. Chen, Berkeley Heights, N.J., assignor to Celanese Corporation, New York, N.Y.
Continuation of application Ser. No. 704,862, Feb. 12, 1968. This application Sept. 23, 1969, Ser. No. 861,228
Int. Cl. C08g *1/16*
U.S. Cl. 260—67
4 Claims

ABSTRACT OF THE DISCLOSURE

Oxymethylene copolymers are prepared by reacting trioxane with a comonomer such as ethylene oxide in the presence of methylene chloride and a polymerization catalyst comprising boron fluoride. These copolymers can be used in a variety of applications such as film production, molding articles and the like.

---

Figure 1:
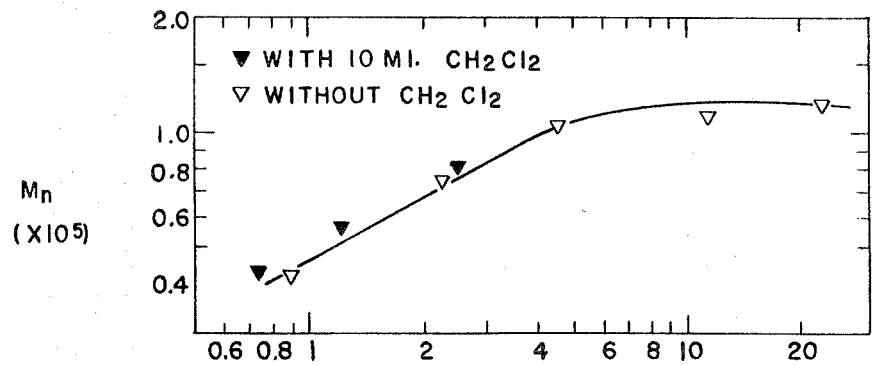

This is a continuation of the now abandoned application Ser. No. 704,862, filed Feb. 12, 1968 by Catherine S. H. Chen.

BACKGROUND OF THE INVENTION

The present invention relates to a process for the preparation of oxymethylene copolymers, and more particularly, to a process wherein trioxane and a comonomer are copolymerized in the presence of methylene chloride and a boron fluoride-containing polymerization catalyst.

It is known that trioxane, which is a cyclic trimer of formaldehyde, can be homopolymerized or copolymerized in the presence of certain polymerization catalysts such as a boron fluoride-containing catalyst to produce tough, thermally stable and moldable oxymethylene polymers having recurring —$CH_2O$— units.

Typical methods of preparing the oxymethylene polymers are described, for example, in United States Pat. No. 2,989,506 of Donald E. Hudgin and Frank M. Berardinelli; by Kern et al. in Angewandte Chemie, 73 (6), 177–186 (Mar. 21, 1961); by Sittig, "Polyacetals: What You Should Known," Petroleum Refiner, 41, 11, 131–170 (November 1962); and in U.S. Pat. No. 3,027,352 of Cheves T. Walling, Frank Brown and Kenneth W. Bartz.

In spite of the commercial availability of oxymethylene polymers, efforts are still being made to produce even higher molecular weight oxymethylene polymers, which could be used alone or blended with the lower molecular weight polymers.

A process has now been developed for preparing these higher molecular weight oxymethylene polymers using as the catalyst a conventional boron fluoride-containing material.

SUMMARY OF THE INVENTION

The primary object of the present invention is to provide a process for the production of oxymethylene copolymers, and particularly oxymethylene copolymers having a higher molecular weight than the copolymers presently commercially available. These and other objects will be apparent from the following description.

In accordance with the present invention, oxymethylene copolymers are prepared by a liquid phase polymerization of trioxane with a comonomer in the presence of methylene chloride and a boron fluoride-containing polymerization catalyst.

The essence or heart of the present invention is the use of methylene chloride together with the boron fluoride-containing catalyst. It has been found that the addition of methylene chloride causes a substantial increase in the molecular weight of the resulting or product oxymethylene copolymer as compared to the molecular weight of the copolymer obtained when the polymerization reaction is conducted in the presence of the same catalyst, but without any methylene chloride. Even more surprising is that when other materials similar to methylene chloride are used in its place, the resulting copolymer molecular weight is essentially the same as or lower than the molecular weight of the product obtained when the catalyst is used alone.

A further important feature of the present invention is that the combination system is limited to the copolymerization of trioxane. Oxymethylene homopolymers obtained by the polymerization of trioxane have essentially the same molecular weight irrespective of whether the boron fluoride-containing catalyst is used alone or in combination with methylene chloride.

Still another important feature of the present invention is that more than about $0.25 \times 10^{-4}$ moles of boron fluoride-containing catalyst per mole of trioxane must be used with the methylene chloride to achieve the improved results. When less catalyst is used the molecular weight of the product will be lower than that obtained with the catalyst alone.

Figure 2:
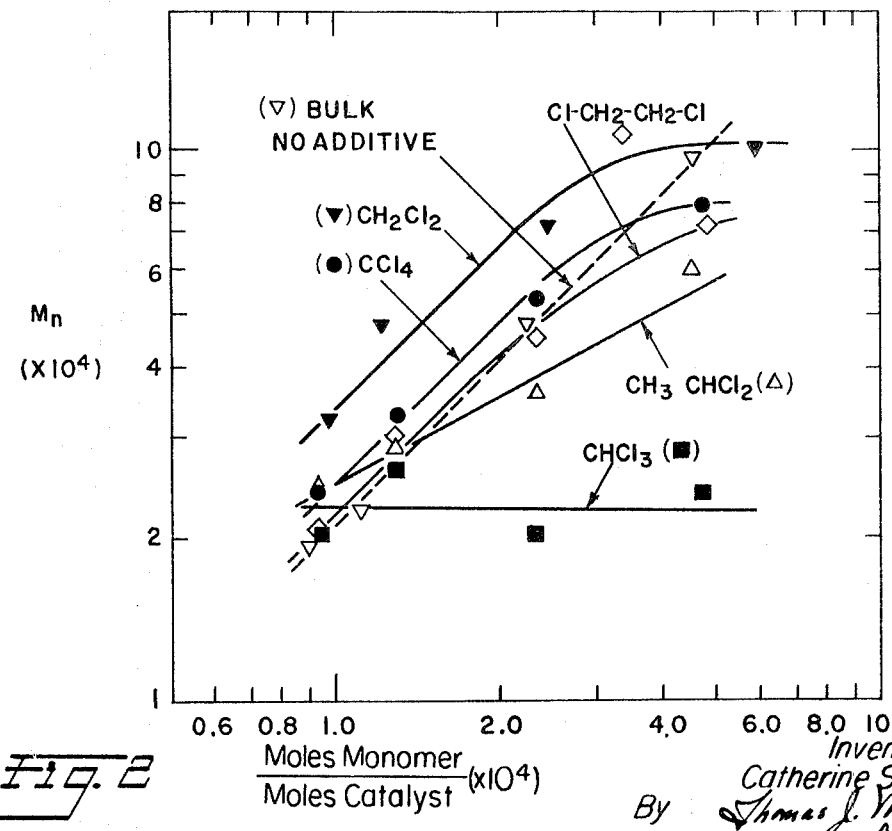
Figure 3:
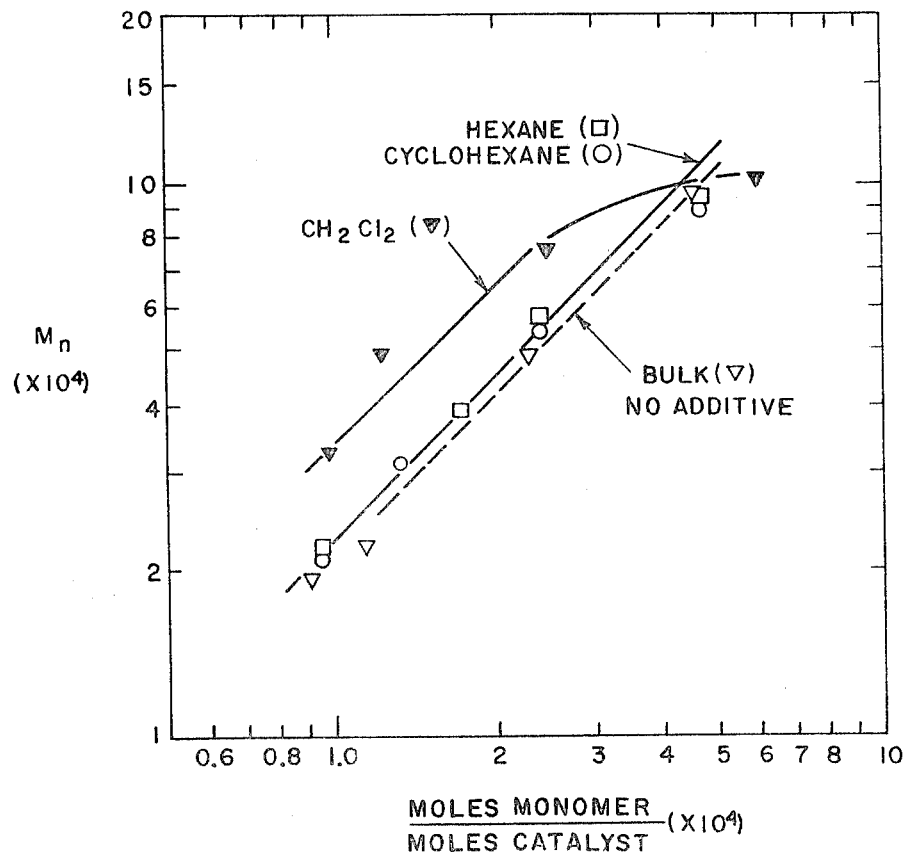

For a better and more complete understanding of the present invention, its objects and advantages, reference should be had to the following description and to the accompanying drawings, in which:

FIG. 1 is a graph of catalyst concentration vs. molecular weight (number average) showing the effect of methylene chloride in the homopolymerization of trioxane with boron trifluoride dibutyl etherate as the catalyst;

FIG. 2 is a similar graph comparing the effect of methylene chloride with similar materials in the copolymerization of trioxane with ethylene oxide using the same catalyst; and FIG. 3 is an additional graph of catalyst concentration vs. molecular weight (number average) comparing the effect of methylene chloride with still other materials in the copolymerization of trioxane with ethylene oxide using boron trifluoride dibutyl ethereate as the catalyst.

DETAILED DESCRIPTION OF THE PRESENT INVENTION

Oxymethylene copolymers are normally defined as having a structure comprising recurring units represented by the general formula

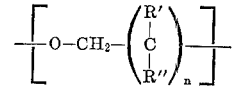

wherein $n$ represents an integer from 0 to 4, and representing 0 (zero) in from 60 to 99.9 percent of the recurring units; and $R'$ and $R''$ represent inert substituents, that is, substituents which are free from interfering functional groups and will not induce undesirable reactions. Preferably, the oxymethylene copolymers have a structure comprising oxymethylene and oxyethylene recurring units wherein from 60 to 99.9 percent, e.g., from 60 to 70 to 99.9 percent of the recurring units are oxymethylene units.

The oxymethylene copolymer produced by the process of the present invention may be defined more specifically as a normally solid, substantially water-insoluble copolymer, the repeating or recurring units of which consist essentially of recurring units represented by the general formula

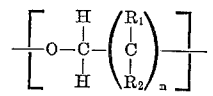

wherein each $R_1$ and $R_2$ is selected from the group consisting of hydrogen, lower alkyl and halogen-substituted lower alkyl radicals, and wherein $n$ is an integer from zero to four, and $n$ being zero in from 85 to 99.9 percent of the recurring units. Each lower alkyl radical preferably has from one to two carbon atoms.

The above described oxymethylene copolymers may be produced in accordance with the process of the present invention by copolymerizing trioxane together with at least one comonomer, and particularly together with a cyclic ether having at least two adjacent carbon atoms.

In general, the cyclic ethers employed in making the oxymethylene copolymer are those represented by the general formula

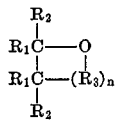

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three. Each lower alkyl and haloalkyl radical preferably has from 1 to 2 carbon atoms.

A particularly preferred class of comonomers are those cyclic ethers having the structure

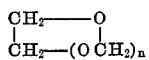

wherein $n$ represents an integer from zero to two.

Preferably ethylene oxide and 1,3-dioxolane are used as the comonomer, however, other cyclic ethers that may be employed are 1,4-dioxane; trimethylene oxide; tetramethylene oxide; pentamethylene oxide; 1,2-propylene oxide; 1,2-butylene oxide; 1,3-butylene oxide and 2,2-di-(chloromethyl)-1,3-propylene oxide.

Still other specific comonomers which may be used are 1,3-dioxane; 1,3,5-trioxepane; beta-propiolactone; gamma-butyrolactone; neopentyl formal; pentaerythritol diformal; paraldehyde; tetrahydrofuran and butadiene monoxide.

These and other commonly used comonomers may be copolymerized with the trioxane to form the desired oxymethylene copolymers, the term "copolymer" as used herein being intended to include terpolymers and higher polymers. For example, the above cyclic ethers may be used with polyepoxides and similar materials to form terpolymers as disclosed in United States patent application Ser. No. 153,720, filed Nov. 20, 1961, by W. E. Heinz et al., now abandoned.

The oxymethylene copolymers of the present invention may also contain or have incorporated therein other interspersed monomeric units such as those derived from lactones, carbonates, cyclic acid hydrates or ethylenically unsaturated compounds such as styrene, diformal ether, vinyl acetate, vinyl methyl ketone or acrolein as disclosed in the aforementioned Kern et al. article.

In forming the oxymethylene copolymers of the present invention, the comonomer is usually used in amounts of from about 0.1 to about 20 weight percent, based on the weight of trioxane, and preferably in amounts of from about 0.1 to about 10 weight percent. When more than one comonomer is used the same weight limitations apply.

Any trioxane polymerization catalyst which contains or comprises boron fluoride may be used in the present invention and is referred to herein as a boron fluoride-containing catalyst.

Exemplary suitable catalysts are boron fluoride (boron trifluoride) and boron fluoride-containing materials such as boron fluoride monohydrate, boron fluoride dihydrate and boron fluoride trihydrate as well as the boron fluoride coordinate complexes with organic compounds, particularly those in which oxygen or sulfur is a donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex and a preferred catalyst for use in the present invention. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Pats. 2,989,505; 2,989,506; 2,989,507; 2,989,508; 2,989,509; all of which are by Donald E. Hudgin and Frank M. Berardinelli; 2,989,510 by George J. Bruni; and 2,989,511 by Arthur W. Schnizer. All the above patents are assigned to the same assignee as the subject application and are incorporated herein by reference.

The amount of boron fluoride-containing catalyst used is in the range of from about $0.25 \times 10^{-4}$ to $2.0 \times 10^{-4}$ moles per mole of trioxane, and preferably from about $0.7 \times 10^{-4}$ to $1.5 \times 10^{-4}$ moles per mole of trioxane. Larger amounts of catalyst may be used if so desired. As previously mentioned, unless more than about $0.25 \times 10^{-4}$ is used no benefit is obtained from the methylene chloride. In fact, below this catalyst concentration the presence of methylene chloride decreases the molecular weight of the oxymethylene polymer.

With reference to the methylene chloride, it is used in an amount in the range of from about 0.1 to 30 weight percent, based on the weight of the trioxane, preferably from about 1 to 20 weight percent, and more preferably from about 1 to 10 weight percent. While slightly higher amounts of methylene chloride can be employed they have no added beneficial effect on the resulting copolymer properties. In fact, these excess amounts of methylene chloride present a recovery problem in the polymerization reaction zone as well as being an unnecessary added expense. When substantially higher amounts of methylene chloride are employed, for example, above about 50 weight percent, a dilution effect occurs. As a result, essentially no molecular weight increase is obtained, that is, the product molecular weight is essentially the same as that obtained when using the catalyst alone, without methylene chloride.

The polymerization of the trioxane with the comonomer in the presence of the boron fluoride-containing catalyst and methylene chloride is conducted in the liquid phase in any conventional mass or bulk, liquid phase polymerization system, on a continuous, semi-continuous or batch basis, for example, as described in United States Patent No. 3,254,053 by Gene J. Fisher, Frank Brown and Walter E. Heinz. In other words, the above four ingredients form a homogeneous liquid phase at the outset or initiation of the polymerization reaction. Accordingly, polymerization temperature in the range of from about 55 to 120° C., and more preferably from about 65 to 90° C. are used.

The polymerization period normally varies from about 0.5 to about 10 minutes and most preferably from about 0.5 to about 2 minutes, for a continuous system.

The majority of the methylene chloride is normally vaporized as the polymerization reaction proceeds and recovered with any additional vaporous materials that may be formed. The oxymethylene copolymer product is conveniently recovered as a finely divided powder as set forth in the aforementioned United States Patent No. 3,254,053.

The oxymethylene copolymer, after formation, is generally washed clean of any residual monomer, comonomer, catalyst and methylene chloride. Any of the well known washing procedures may be employed such as one or more water washes, or washed first with a catalyst neutralizing agent such as described in United States Patent No. 2,989,509 by Donald E. Hudgin and Frank M. Berardinelli.

If desired, the resulting oxymethylene copolymers may be end-capped by any of the methods well known to those skilled in the art, e.g., by acylation or esterification after polymerization or even during the polymerization reaction by the use of selected chain transfer agents such as methylal. Stabilizers such as chain-scission inhibitors, antioxidants and the like may also be added to or incorporated in the copolymer in any convenient manner if so desired.

The resulting oxymethylene copolymers are thermoplastic materials having a melting point of at least 160° C., and normally are millable at about 190° C. to 200° C.

These resulting or product oxymethylene copolymers may be, either alone or in combination with lower molecular weight oxymethylene polymers or copolymers, molded, extruded and the like to yield fibers, films, articles and the like.

The invention is additionally illustrated by the following example:

EXAMPLE

Table I below is a compilation of various copolymerization and homopolymerization experiments made with boron trifluoride dibutyl etherate catalyst.

In each of the copolymerization experiments listed in Table I below, 1.15 moles of trioxane were copolymerized with 0.048 mole of ethylene oxide at a polymerization temperature of 65° C.±1° C. The homopolymerization experiments were conducted in the same manner, but with trioxane alone.

Each of the polymerization experiments below was conducted as a liquid phase, mass polymerization. In each instance when an additive such as methylene chloride was used, 10 ml. were employed.

The polymer product from each experiment was recovered from the polymerization vessel, washed and the molecular weight determined.

TABLE I

| Additive (10 ml.) | Moles monomer/ moles catalyst (× 10⁴) | Comonomer | Molecular weight number average ($M_n$) (×10⁵) |
|---|---|---|---|
| None | 22.80 | None | 1.20 |
|  | 11.40 |  | 1.10 |
|  | 4.56 |  | 1.04 |
|  | 2.28 |  | 0.750 |
|  | 0.911 |  | 0.425 |
| CH₂Cl₂ | 2.47 |  | 0.81 |
|  | 1.24 |  | 0.56 |
|  | 0.74 |  | 0.43 |
| None | 4.74 | Ethylene oxide | 0.97 |
|  | 2.38 |  | 0.48 |
|  | 1.14 |  | 0.22 |
|  | 0.95 |  | 0.19 |
|  | 5.93 |  | 0.01 |
| CH₂Cl₂ | 2.47 |  | 0.73 |
|  | 1.24 |  | 0.48 |
|  | 0.988 |  | 0.32 |
|  | 4.74 |  | 0.24 |
| CHCl₃ | 2.38 |  | 0.20 |
|  | 1.32 |  | 0.26 |
|  | 0.95 |  | 0.20 |
|  | 4.74 |  | 0.80 |
| CCl₄ | 2.38 |  | 0.54 |
|  | 1.32 |  | 0.33 |
|  | 0.95 |  | 0.25 |
|  | 4.74 |  | 0.61 |
| CH₃CHCl₂ | 2.38 |  | 0.36 |
|  | 1.32 |  | 0.29 |
|  | 0.95 |  | 0.25 |
|  | 4.74 |  | 0.74 |
| ClCH₂CH₂Cl | 2.38 |  | 0.47 |
|  | 1.32 |  | 0.30 |
|  | 0.95 |  | 0.20 |
|  | 4.74 |  | 0.93 |
| Hexane | 2.38 |  | 0.57 |
|  | 1.68 |  | 0.39 |
|  | 0.95 |  | 0.22 |
|  | 4.74 |  | 0.89 |
| Cyclohexane | 2.38 |  | 0.55 |
|  | 1.38 |  | 0.31 |
|  | 0.95 |  | 0.20 |

The above data were used to prepare the FIGS. 1 to 3.

From FIG. 1 it can be seen that the use of methylene chloride in the homopolymerization of trioxane has essentially no advantageous effect on the molecular weight of the resulting oxymethylene polymer. The molecular weight is essentially the same when the catalyst is used alone or with methylene chloride.

In contrast, FIGS. 2 and 3 show a substantial increase as much as 40 percent or more, in the molecular weight of the copolymers when methylene chloride is used in combination with the boron fluoride-containing catalyst as compared to using the catalyst alone.

FIGS. 2 and 3 also illustrate that other additives similar to methylene chloride do not have the same beneficial effect. In fact, except for carbon tetrachloride, which caused a slight increase in molecular weight, the other additives caused little if any increase to occur and frequently resulted in lower molecular weights being obtained.

The principle, preferred embodiment, and mode of operation of the present invention have been described in the foregoing specification. However, it should be understood that the invention which is intended to be protected herein, may be practiced otherwise than as described without departing from the scope of the appended claims.

What is claimed is:

1. A process for the production of higher molecular weight oxymethylene copolymers which comprises copolymerizing trioxane with at least one comonomer selected from the group consisting of compounds represented by the formulas:

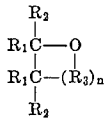

and

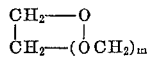

wherein each $R_1$ and $R_2$ is selected from the group consisting of hydrogen, lower alkyl, and halogen-substituted lower alkyl radicals, and each $R_3$ is selected from the group consisting of methylene, oxymethylene, lower alkyl and haloalkyl substituted methylene, and lower alkyl and haloalkyl-substituted oxymethylene radicals, each lower alkyl and haloalkyl radical having from 1 to 2 carbon atoms, $n$ is an integer from zero to three, and $m$ is an integer from zero to two, in the liquid phase, in the presence of less than 50 weight percent methylene chloride, based on the weight of trioxane, and at least $0.25 \times 10^{-4}$ moles of boron fluoride-containing catalyst per mole of trioxane.

2. The process of claim 1 wherein said methylene chloride is present at from about 0.1 to about 30 weight percent, based on the weight of trioxane, and said boron fluoride-containing catalyst is present at from about $0.25 \times 10^{-4}$ to about $2.0 \times 10^{-4}$ moles per mole of trioxane.

3. The process of claim 2 wherein said boron fluoride-containing catalyst is boron trifluoride dibutyl etherate and is present at from about $0.7 \times 10^{-4}$ to about $1.5 \times 10^{-4}$ moles per mole of trioxane.

4. The process of claim 3 wherein said comonomer is ethylene oxide and said methylene chloride is present at from about 1 to about 10 weight percent based on the weight of trioxane.

References Cited

UNITED STATES PATENTS 3,197,438  7/1965  Wood _____ 260—67FP
3,377,318  4/1968  Kiss _____ 260—73
3,252,939  5/1966  Small _____ 260—67FP WILLIAM H. SHORT, Primary Examiner L. M. PHYNES, Assistant Examiner U.S. Cl. X.R.

260—33.8

PO-1050
(5/69)

UNITED STATES PATENT OFFICE
CERTIFICATE OF CORRECTION

Patent No. 3597397            Dated August 3, 1971

Inventor(s) Catherine S. H. Chen

It is certified that error appears in the above-identified patent and that said Letters Patent are hereby corrected as shown below:

In the specification in Column 5, line 49, in Table I last column the thirteenth number down "0.01" should read -- "1.01 --".

Signed and sealed this 21st day of December 1971.

(SEAL)
Attest:

EDWARD M. FLETCHER, JR.      ROBERT GOTTSCHALK
Attesting Officer            Acting Commissioner of Patents